(12) United States Patent
Burkot et al.

(10) Patent No.: US 12,462,173 B2
(45) Date of Patent: Nov. 4, 2025

(54) QUANTUM CIRCUIT AND METHODS FOR USE THEREWITH

(71) Applicant: BEIT Inc., Millbrae, CA (US)

(72) Inventors: Wojciech Burkot, Cracow (PL); Jan Tulowiecki, Giebułtów (PL); Vladyslav Hlembotskyi, Cracow (PL); Witold Jarnicki, Cracow (PL)

(73) Assignee: BEIT Inc., Milbrae (CA)

( * ) Notice: Subject to any disclaimer, the term of this patent is extended or adjusted under 35 U.S.C. 154(b) by 1104 days.

(21) Appl. No.: 17/196,037

(22) Filed: Mar. 9, 2021

(65) Prior Publication Data

US 2021/0287127 A1   Sep. 16, 2021

Related U.S. Application Data

(60) Provisional application No. 62/990,122, filed on Mar. 16, 2020.

(51) Int. Cl.
| | |
|---|---|
| *G06N 10/20* | (2022.01) |
| *G06F 17/14* | (2006.01) |
| *G06N 10/40* | (2022.01) |
| *G06N 10/60* | (2022.01) |
| *H03K 19/00* | (2006.01) |

(52) U.S. Cl.
CPC ........... *G06N 10/20* (2022.01); *G06F 17/145* (2013.01); *G06N 10/40* (2022.01); *G06N 10/60* (2022.01); *H03K 19/00* (2013.01)

(58) Field of Classification Search
None
See application file for complete search history.

(56) References Cited

U.S. PATENT DOCUMENTS

| | | | |
|---|---|---|---|
| 7,028,275 B1 * | 4/2006 | Chen | G06N 10/00 703/2 |
| 7,383,235 B1 | 6/2008 | Ulyanov et al. | |
| 2003/0149511 A1 | 8/2003 | Rizzotto et al. | |

(Continued)

FOREIGN PATENT DOCUMENTS

EP            1416437 A1       5/2004

OTHER PUBLICATIONS

Korepin et al, "Simple Algorithm for Partial Quantum Search." arXiv preprint quant-ph/0504157 (2005). (Year: 2005).*

(Continued)

*Primary Examiner* — Viker A Lamardo
*Assistant Examiner* — Leah M Feitl
(74) *Attorney, Agent, or Firm* — Katz Ruby & Carle LLP; Katherine C. Stuckman; Bruce E. Stuckman (57) ABSTRACT

A method is presented for use with a quantum circuit and a quantum register having a plurality of qubits. The method includes: sequentially calling, via a plurality of oracle gates of the quantum circuit, a quantum oracle operator on a plurality of qubit states to produce a sequence of quantum oracle calls; applying, via a plurality of diffusion gates of the quantum circuit, a plurality of diffusion operators, wherein a selected one or more of a plurality of diffusion operators is applied after each of the quantum oracle calls in the sequence of oracle calls; and generating a quantum computing result based on a measurement from the plurality of qubits, after having applied the sequence of oracle calls and the plurality of diffusion operators.

18 Claims, 8 Drawing Sheets

(56) References Cited

U.S. PATENT DOCUMENTS

| | | | | |
|---|---|---|---|---|
| 2005/0167658 | A1* | 8/2005 | Williams | G06N 10/20 257/31 |
| 2006/0224547 | A1* | 10/2006 | Ulyanov | G06N 10/20 706/62 |
| 2018/0246848 | A1* | 8/2018 | Douglass | G06N 10/00 |
| 2018/0322409 | A1* | 11/2018 | Barends | G06N 10/00 |
| 2020/0272930 | A1* | 8/2020 | Aspuru-Guzik | G06N 3/082 |

OTHER PUBLICATIONS

Zhang et al, "Quantum partial search for uneven distribution of multiple target items". Quantum Inf Process 17, 143 (2018). https://doi.org/10.1007/s11128-018-1907-9 (Year: 2018).*

Satoh et al, "Subdivided Phase Oracle for NISQ Search Algorithms." arXiv preprint arXiv:2001.06575 (Jan. 2020). (Year: 2020).*

Mandviwalla et al, "Implementing Grover's Algorithm on the IBM Quantum Computers," 2018 IEEE International Conference on Big Data (Big Data), Seattle, WA, USA, 2018, pp. 2531-2537, doi: 10.1109/BigData.2018.8622457. (Year: 2018).*

Canadian Intellectual Property Office; Office Action; Application No. 3168532; Nov. 15, 2023; 5 pgs.

International Searching Authority; International Search Report and Written Opinion; Int'l Application No. PCT/US2021/021673; Jun. 25, 20216; 8 pgs.

Rashad, M.Z.; Quantum parity algorithms as oracle calls, and application in Grover Database search; Advanced Computing: An International Journal (ACIJ); vol. 3, No. 2; Mar. 2012; 11 pp.

Zhang, et al.; Depth optimization of quantum search algorithm beyond Grover's algorithm; arXiv:1908.04171v2; Dec. 31, 2019; 14 pp retrieved from <https://arxiv.org/abs/1908.04171v2>.

European Patent Office; Extended European Search Report; Application No. 21772642.1; Apr. 15, 2024; 8 pgs.

Ju, et al.; Quantum Circuit Design and Analysis for Database Search Applications; IEEE Transactions on circuits and Systems I: Regular Papers; Nov. 1, 2007; pp. 2552-2563; vol. 54, No. 11.

Younes et al.; A Hybrid Quantum Search Engine: A Fast quantum Algorithm for Multiple Matches; ARXIV.org; Cornell University Library; Nov. 25, 2003; 26 pgs.

* cited by examiner

QUANTUM CIRCUIT AND METHODS FOR USE THEREWITH

CROSS-REFERENCE TO RELATED APPLICATIONS

The present U.S. Utility Patent Application claims priority pursuant to 35 U.S.C. § 119(e) to U.S. Provisional Application No. 62/990,122, entitled "QUANTUM CIRCUIT AND METHODS FOR USE THEREWITH", filed Mar. 16, 2020, which is hereby incorporated herein by reference in its entirety and made part of the present U.S. Utility Patent Application for all purposes.

BACKGROUND OF THE INVENTION

Technical Field of the Invention

This invention relates generally to computer systems and particularly to quantum computing.

Description of Related Art

Computing devices are known to communicate data, process data, and/or store data. Such computing devices range from wireless smart phones, laptops, tablets, personal computers (PC), work stations, smart watches, connected cars, and video game devices, to web servers and data centers that support millions of web searches, web applications, or on-line purchases every day. In general, a computing device includes a processor, a memory system, user input/output interfaces, peripheral device interfaces, and an interconnecting bus structure.

Classical digital computing devices operate based on data encoded into binary digits (bits), each of which has one of the two definite binary states (i.e., 0 or 1). In contrast, a quantum computer utilizes quantum-mechanical phenomena to encode data as quantum bits or qubits, which can be in superpositions of the traditional binary states.

DETAILED DESCRIPTION OF THE INVENTION

Figure 1A:
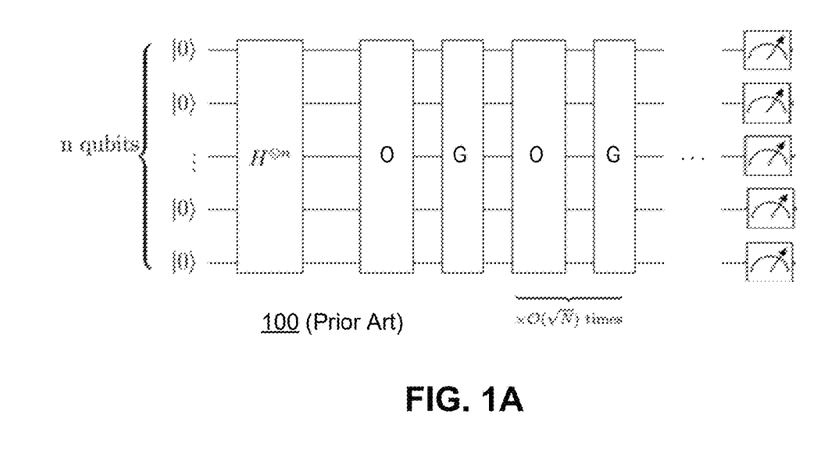
FIG. 1A is a schematic block diagram of a prior art quantum circuit.

FIG. 1A is a schematic block diagram 100 of a prior art quantum circuit. In particular, a quantum circuit implementation of Grover's algorithm is presented. Grover's algorithm is a quantum algorithm that finds, with high probability, a quantum solution. Grover's algorithm is based on the unique input to a black box function called a "quantum oracle", "oracle operator", "oracle function" or simply "oracle" that produces a particular output value. Grover's algorithm converges in just O(sqrt(N)) evaluations of the oracle function, where N is the size of the function's domain. Grover's algorithm has been applied to the problem of unstructured database search, or more generally the inversion of a function.

In operation, n qubits are initialized and applied to a corresponding number of Hadamard (H) gates. Each input is Hadamard transformed in order to achieve a uniform superposition of all the initial states. An oracle gate (O) performs an oracle call for each of the transformed qubit states and a diffusion gate (G) performs the Grover diffusion operator. This process is repeated O(sqrt(N)) times. A measurement of the qubits after this point yields the quantum solution with a probability that approaches 1 for large values of N. See e.g., John Wright, Lecture 4: Grover's Algorithm, Carnegie Mellon University, Sep. 21, 2015.

Figure 1B:
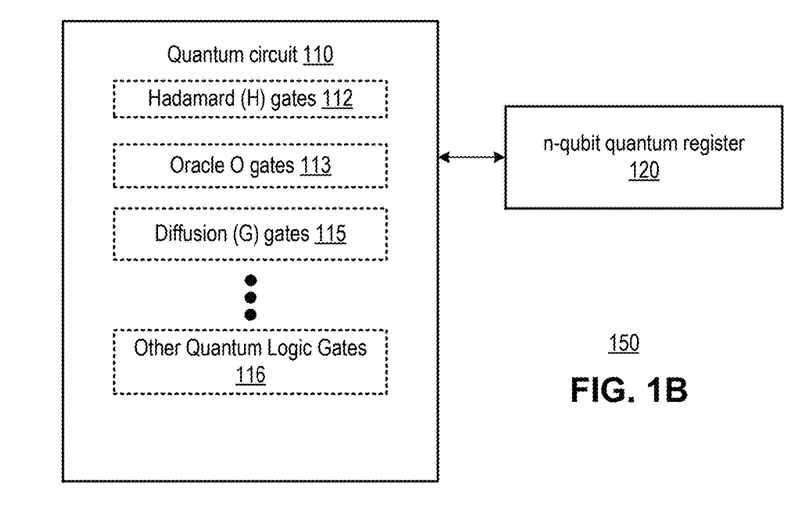
FIG. 1B is a block diagram of an embodiment of a quantum computing architecture in accordance with the present invention.

FIG. 1B is a block diagram 150 of an embodiment of a quantum computing architecture in accordance with the present invention. In particular, a quantum circuit 110 is presented that includes one or more Hadamard (H) gates 112 that apply Hadamard transforms to one or more of the plurality of qubits; oracle (O) gates 113 that call a quantum oracle operator on the corresponding plurality of qubits (e.g. qubit states) to produce a sequence of quantum oracle calls; and/or Grover diffusion gates (G) 115 that apply one or more different diffusion operators. In particular, a plurality of diffusion gates (G), can be used to apply a plurality of different diffusion operators, wherein a selected one or more of a plurality of diffusion operators is applied after each of the quantum oracle calls in the sequence of oracle calls. While a plurality of different diffusion operators are used, one or more of these different diffusion operators can be applied more than once. The other quantum logic gates 116, when present, can further include X gates, Y gates, Z gates, phase shift gates, controlled gates, such as CX, CY and/or CZ gates, swap gates, Toffoli gates, Deutsch gates, Ising gates, Fredkin gates, Adalus gates and/or other quantum logic gates and combinations thereof in various circuit configurations. In operation, the quantum circuit 110 generates a quantum computing result based on a measurement from the plurality of qubits—with or without the use of additional (ancillary or ancilla) working qubits.

Consider an example implementation of Grover's algorithm where a quantum circuit 110 uses oracle testing for the solution in an n-qubit quantum computer register 120 containing the superposition of all the candidate solutions— created using Hadamard transforms on the qubits in said register and may or might not use additional (ancillary) working qubits. As used in this context, the quantum oracle function can be part of or external to the computation pictured. Furthermore, the oracle function can be a "black box" or be another quantum function where the gates constituting it can be modified or otherwise produce an oracle result, as a part of the computation described (e.g., like a function testing the satisfiability of a set of clauses by the assignments of variables in the superposition). Unlike quantum circuits that rely on Grover's algorithm that uses a single Grover's diffusion operator after each oracle call) the quantum circuit employs at least two different diffusion operators, at least one of them being used after each oracle call. The quantum circuit 110 can further be used in circuit implementations of other quantum solutions, in addition to the example implementation of Grover's Algorithm above.

The different diffusion operators can operate similarly to Grover's diffusion operator, but operate on only a subset of wirelines/qubits, as opposed to all of the qubits in the register. In various embodiments, each of the plurality of diffusion operators operates on a unique (different) non-zero proper subset of the plurality of qubits. These different diffusion operators can include, for example, 2-qubit operators acting only on neighboring qubits, however, other examples operating on p-neighboring qubits (including p=1 or p>2), and/or other selected subsets of qubits, etc., can likewise be employed. Other non-Grover diffusion operators can be employed as well. Furthermore, the diffusion operators may or may not act on the same qubits and may or may not be identical up to the choice of qubits they act on. The diffusion operators are able to reach each of the states need to be chosen so if one of them acts on a subset of states in such a way that the output belongs to the same subset, then there is another operator, generating the output outside of this subset when acting on the input state in the set.

In various embodiments, the oracle may or may not mark the selected element with a phase change, or may or may not code the result to an additional working (ancilla) qubit, providing the way to measure the result, which in turn can be used to execute other parts of the quantum circuit 110 conditionally, based on a measurement result.

The oracle and the diffusion operators can be used in any sequence, and the order of applying these diffusion operators can be optimized to find the partial solution rather than the final one, for example, to be subsequently used with another circuit utilizing the same oracle or a different oracle, such as a simpler oracle. The oracle/diffusion operator sequence can be optimized so a measurement, such as a measurement of an ancillary qubit or other qubit, will allow for conditional execution of subsequent parts of the circuit, for all or nearly all measurement results, so the total probability of success is increased in comparison with just the final measurement. The oracle/diffusion operator sequence can be optimized, for example, to generate shorter circuits with lower success probability than longer ones, resulting in lower expected number of the oracle calls needed to obtain the solution.

In various embodiments, the diffusion operators can be constructed so the complexity of oracles is reduced around diffusion operators G, by omitting parts of circuits of oracles commuting with G with no change to the result. In accordance with this example, access to the oracle is available, such as the case of oracle testing satisfiability of the assignment of variables in a Boolean satisfiability problem, other satisfiability problem, or other problem were access to the oracle is possible. Scaling of the complexity of the circuit with increased size the database's number of records is no worse than $O(Log(N)*sgrt(N))$, this can be further optimized on the case by case basis, depending on the particular quantum computing problem being solved.

In various embodiments, the H gates 112, O gates 113, G gates 115 and other quantum logic gates 116 of the quantum circuit 110 can be implemented with one or more processing devices. Each such processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. Each such processing device can operate in conjunction with an attached memory and/or an integrated memory element such as classical memory or other memory device, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information.

Note that if the quantum circuit 110 is implemented via more than one processing device, the processing devices may be centrally located (e.g., directly coupled together via a wired and/or wireless bus structure) or may be distributedly located (e.g., cloud computing via indirect coupling via a local area network and/or a wide area network). Further note that if the quantum circuit 110 implements one or more of its gates or other functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, a memory can store, and a processing device can execute, hard coded and/or other operational instructions corresponding to at least some of the steps and/or functions illustrated in one or more of the Figures. Such a memory device or memory element can be tangible memory device or other non-transitory storage medium included in or implemented as an article of manufacture.

Further discussion regarding the operation of the quantum circuit 110, including several optional functions and features are described in conjunction with the figures that follow.

FIGS. 2A-2D are schematic block diagrams 200, 225, 250 and 275 of embodiments of a quantum circuit 110 in accordance with the present invention. In particular, 4-qubit examples are shown. The wire state for each qubit is shown in a Bloch-sphere representation for purposes of illustration. As discussed above, the oracle and the diffusion operators can be used in any sequence and the order of applying them can be optimized to find the partial solution rather than the final one, for example, to be subsequently used with another circuit utilizing the same oracle or a different such as a simpler oracle.

Figure 2A:
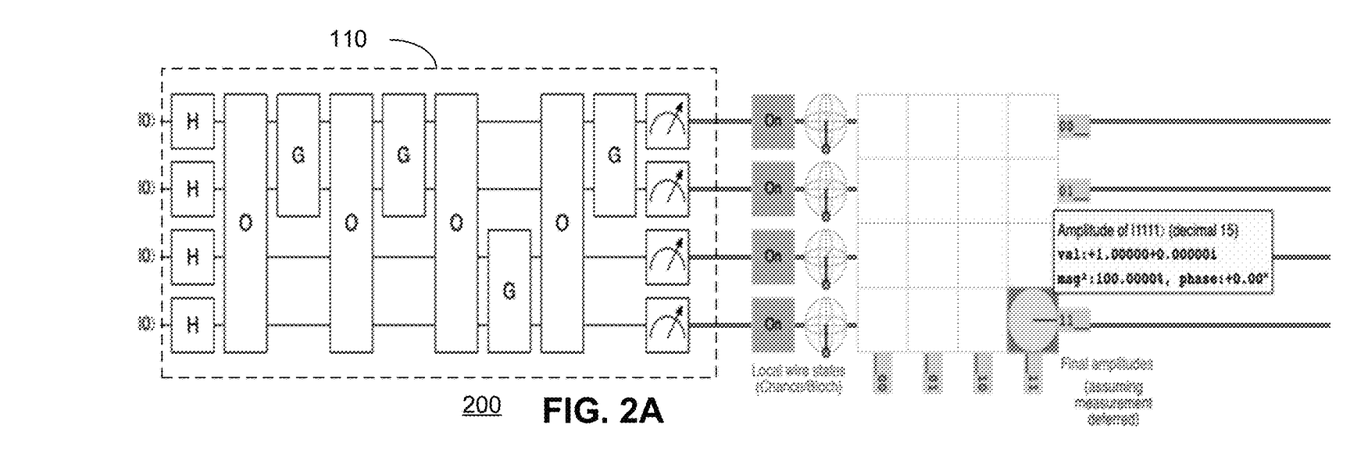
FIG. 2A is a schematic block diagram of an embodiment of a quantum circuit in accordance with the present invention.

In FIG. 2A, the four qubit states are initialized to zero and four Hadamard gates are employed. There are four oracle calls. The diffusion gates employ two different diffusion operators, a first one on the upper two qubits and a second one on the lower two qubits. The first diffusion operator is applied three times and the second diffusion operator is applied only once. The full quantum circuit 110 yields the desired result with certainty.

Figure 2B:
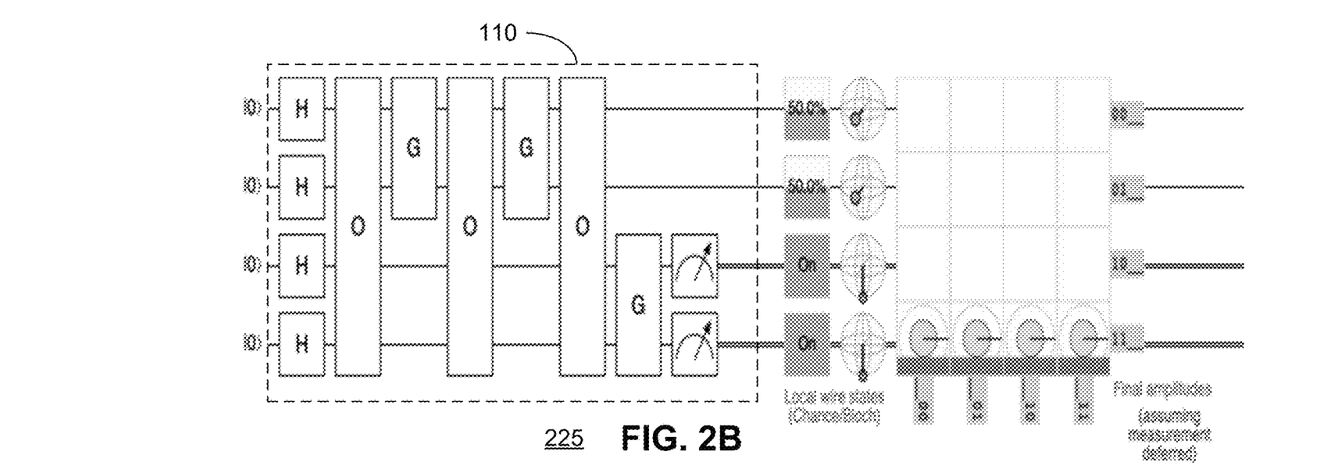
FIG. 2B is a schematic block diagram of an embodiment of a quantum circuit in accordance with the present invention.

In FIG. 2B, the four qubit states are initialized to zero and four Hadamard gates are employed. There are three oracle calls. The diffusion gates employ two different diffusion operators, a first one on the upper two qubits and a second one on the lower two qubits. The first diffusion operator is applied two times and the second diffusion operator is applied only once. The partial circuit of FIG. 2B determines the partial solution. Using partial measurement allows for a division of the circuit into two shorter ones.

Figure 2C:
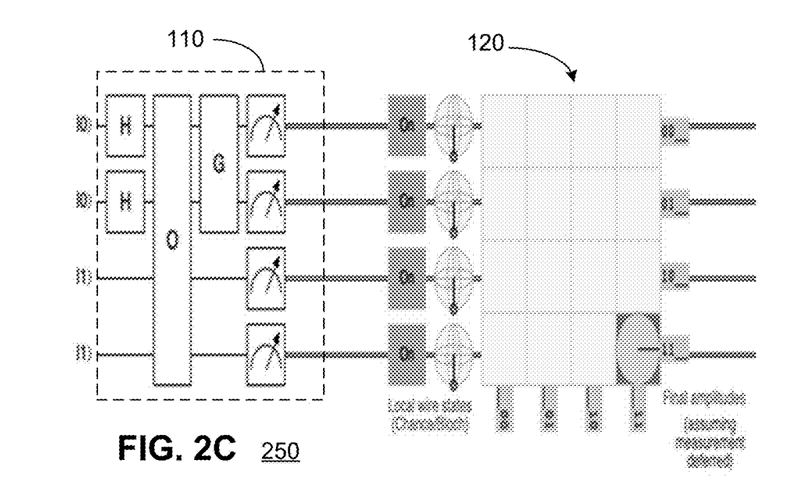
FIG. 2C is a schematic block diagram of an embodiment of a quantum circuit in accordance with the present invention.
Figure 2D:
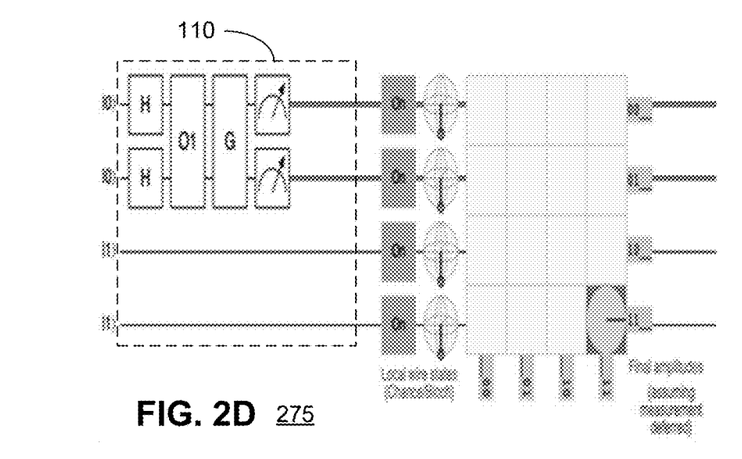
FIG. 2D is a schematic block diagram of an embodiment of a quantum circuit in accordance with the present invention.

In FIG. 2C, the partial solution from FIG. 2B is used in a second circuit for register state initialization. The upper two qubit states are initialized to zero while the lower two are initialized to one. Two Hadamard gates are employed on the upper two qubits. There is only one oracle call. The first diffusion operator is applied only once. Alternatively, the partial solution may be used with a modified oracle, (01 of FIG. 2D), the operation of which uses the information from the partial solution of FIG. 2B.

Figure 3A:
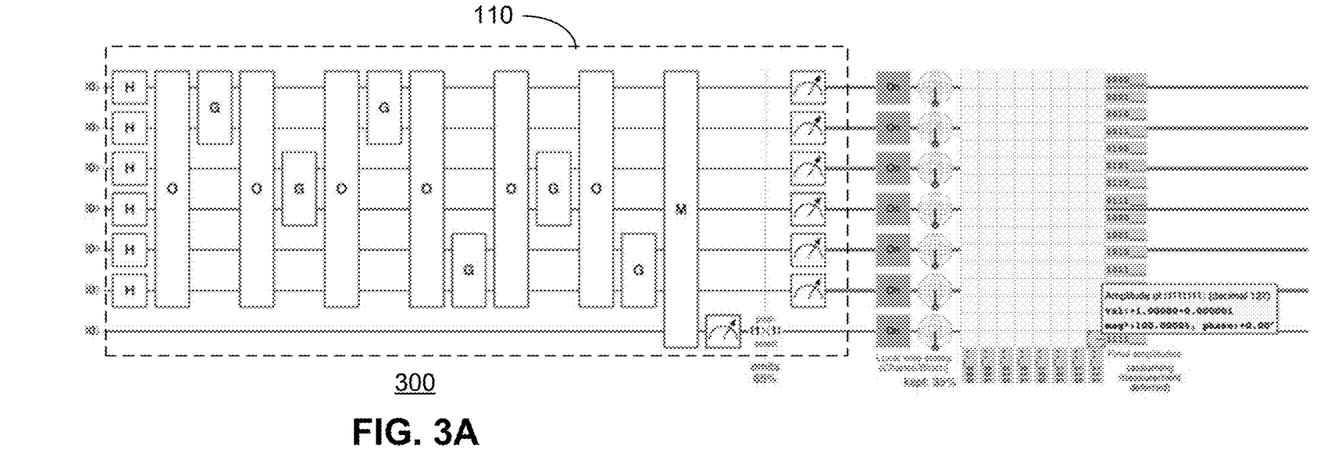
FIG. 3A is a schematic block diagram of an embodiment of a quantum circuit in accordance with the present invention.
Figure 3B:
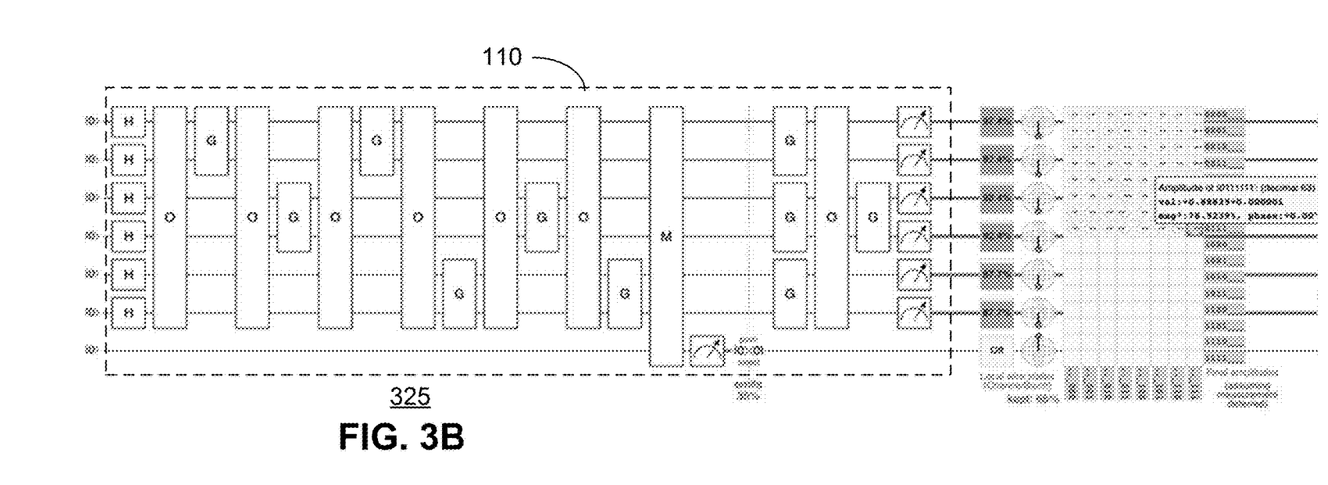
FIG. 3B is a schematic block diagram of an embodiment of a quantum circuit in accordance with the present invention.

FIGS. 3A-3B are schematic block diagrams 300 and 325 of embodiment of a quantum circuit 110 in accordance with the present invention. In particular, a 7-qubit example is shown. As discussed above, the oracle/diffusion operator sequence can be optimized so a measurement of one or more qubits, will allow for conditional execution of subsequent parts of the circuit, for all or nearly all measurement results so the total probability of success is increased in comparison with just the final measurement.

In the embodiment shown, the probability of success is increased by a conditional execution of some gates based on the partial measurement of one qubit. If the measurement after oracle M yields success, measuring the qubits yields the result as shown in FIG. 3A. If the measurement after oracle M yields failure, the measurement had collapsed the state of the register to the superposition not containing the solution and the execution of the gates to the right of the dashed vertical line follows as shown in FIG. 3B. In various embodiments, this further part may contain more conditional executions, and yields the result with higher probability— i.e., with the total probability of success higher than without the in-circuit measurement.

Figure 4A:
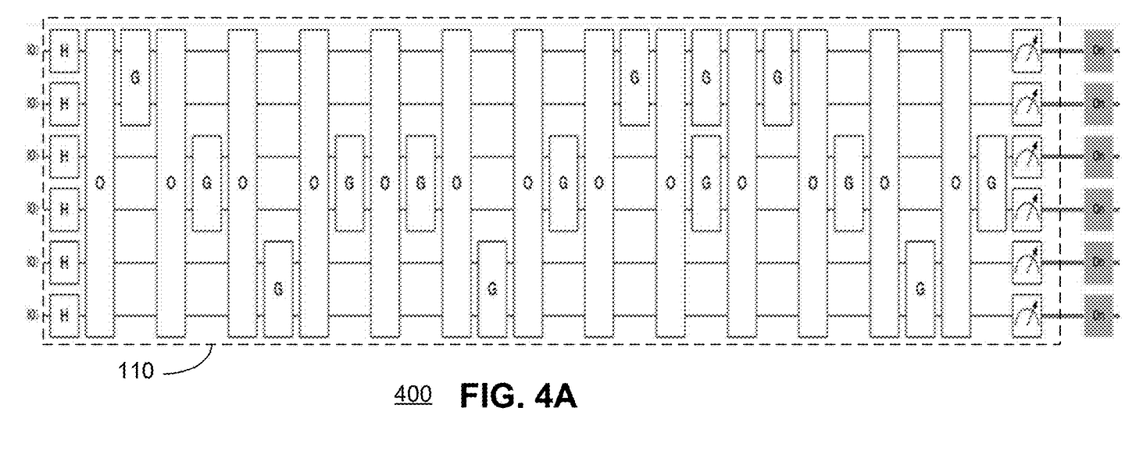
FIG. 4A is a schematic block diagram of an embodiment of a quantum circuit in accordance with the present invention.
Figure 4B:
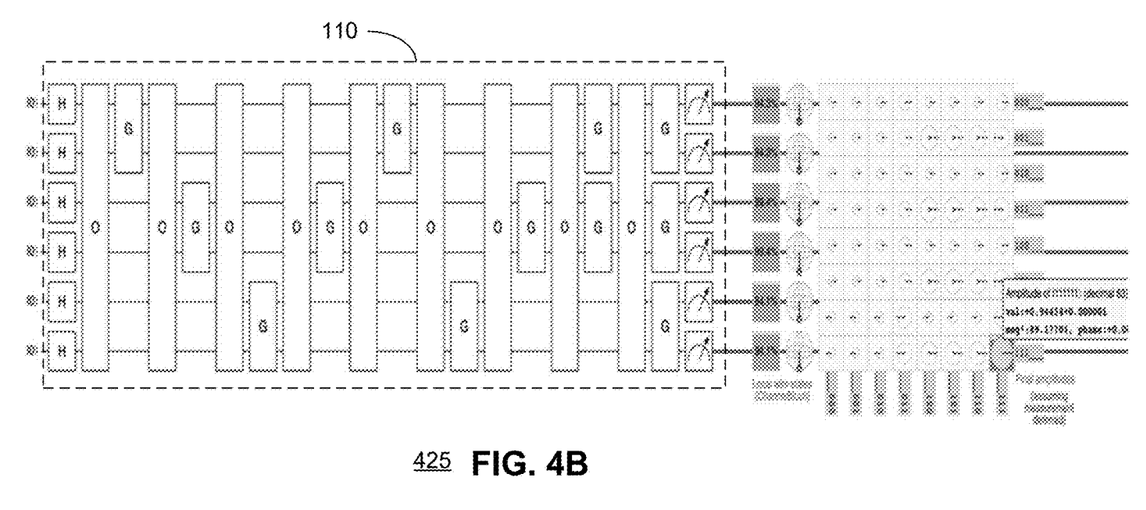
FIG. 4B is a schematic block diagram of an embodiment of a quantum circuit in accordance with the present invention.

FIGS. 4A-4B are schematic block diagrams 400 and 425 of embodiments of a quantum circuit 110 in accordance with the present invention. In particular, 6-qubit examples are shown. As discussed above, the oracle/diffusion operator sequence can be optimized to generate shorter circuits with lower success probability than longer ones, resulting in lower expected number of the oracle calls needed to obtain the solution.

For any oracle there exists a circuit that has 100% probability (P) of success. FIG. 4A presents a quantum circuit 110 with 13 oracle calls. This results in P=1, since the expected number of calls=13. There are, however, shorter circuits with lower success probability that may result in lower expected number of the oracle calls needed to obtain the solution. FIG. 4B presents a quantum circuit 110 with 9 oracle calls. This results in P=0.89, since the expected number of calls=10.1.

Figure 5:
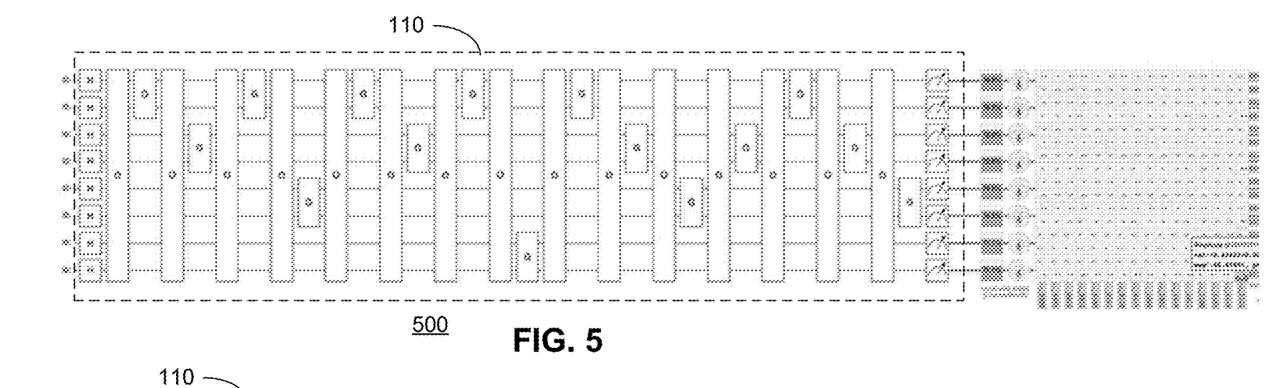
FIG. 5 is a schematic block diagram of an embodiment of a quantum circuit in accordance with the present invention.

FIG. 5 is a schematic block diagram 500 of an embodiment of a quantum circuit 110 in accordance with the present invention. In particular, an 8-qubit example is shown. As discussed above, scaling of the complexity of the quantum circuit 110 with increased size of the number of records in the quantum computing register 120 is no worse than O(Log(N)*sqrt(N)). This is an upper bound and the quantum circuit 110 can be further optimized on the case-by-case basis, depending on the particular quantum computing problem being solved.

Figure 6:
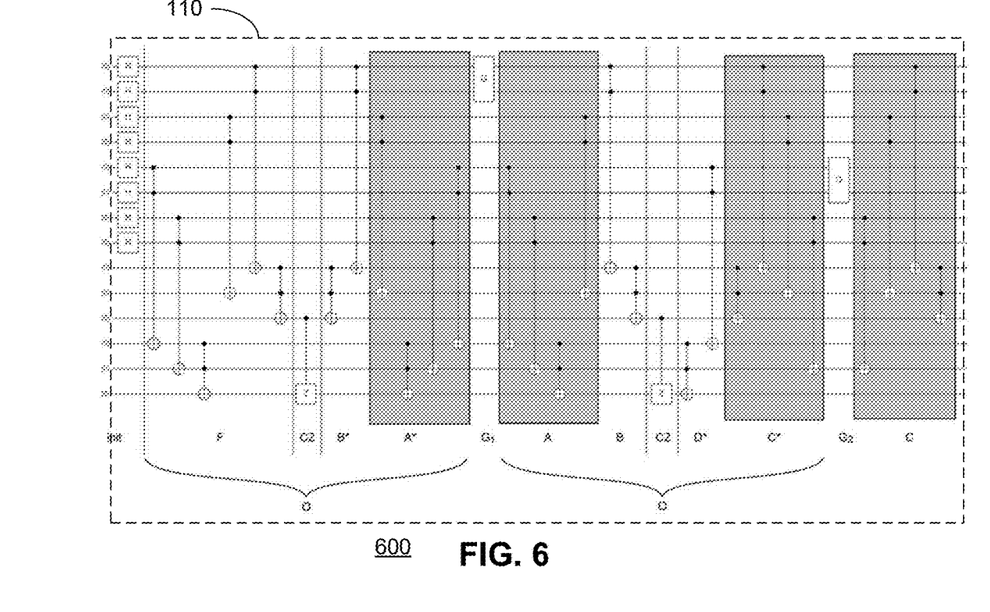
FIG. 6 is a schematic block diagram of an embodiment of a quantum circuit in accordance with the present invention.

FIG. 6 is a schematic block diagram 600 of an embodiment of a quantum circuit 110 in accordance with the present invention. In particular, a 14-qubit example is shown. As discussed above, the diffusion operators can be constructed so the complexity of oracles is reduced around diffusion operators G, by omitting parts of circuits of oracle gates commuting with G with no change to the result. In the example shown, grayed-out parts of oracle gate around the diffusion operators G can be omitted. The choice of A, B, C, D, . . . can be adapted depending on the particular operators used. The diffusion operators used between consecutive oracle calls may or may not be different and may or may not use different sets of qubits.

Figure 7:
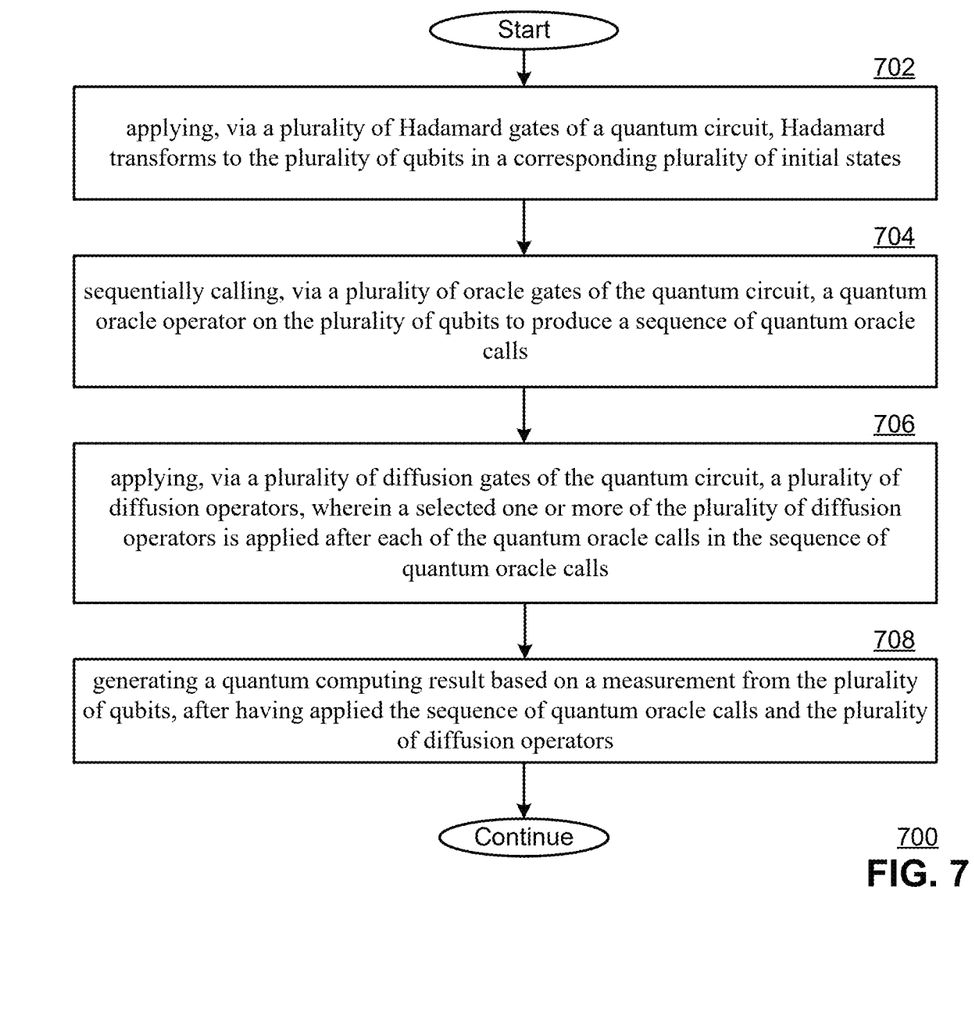
FIG. 7 is a flow diagram of an embodiment of a method in accordance with the present invention.

FIG. 7 is a flow diagram 700 of an embodiment of a method in accordance with the present invention. In particular, a method is presented for use with one or more functions and features described in conjunctions with FIGS. 1-6. Step 702 includes applying, via a plurality of Hadamard gates of a quantum circuit, Hadamard transforms to the plurality of qubits in a corresponding plurality of initial states. Step 704 includes sequentially calling, via a plurality of oracle gates of the quantum circuit, a quantum oracle operator on the plurality of qubits to produce a sequence of quantum oracle calls. Step 706 includes applying, via a plurality of diffusion gates of the quantum circuit, a plurality of diffusion operators, wherein a selected one or more of the plurality of diffusion operators is applied after each of the quantum oracle calls in the sequence of oracle calls. Step 708 includes generating a quantum computing result based on a measurement from the plurality of qubits, after having applied the sequence of oracle calls and the plurality of diffusion operators.

In various embodiments, each of the plurality of diffusion operators operates on a unique non-zero proper subset of the plurality of qubits. Further, the unique non-zero proper subset of the plurality of qubits can include two or more neighboring qubits of the plurality of qubits. Furthermore, the diffusion operators may or may not act on the same qubits and may or may not be identical up to the choice of qubits they act on. The diffusion operators are able to reach each of the states need to be chosen so if one of them acts on a subset of states in such a way that the output belongs to the same subset, then there is another operator, generating the output outside of this subset when acting on the input state in the set.

As discussed above, the oracle may or may not mark the selected element with a phase change, or may or may not code the result to an additional working qubit, providing the way to measure the result, which in turn can be used to execute other parts of the quantum circuit 110 conditionally, based on a measurement result.

As discussed above, the oracle and the diffusion operators can be used in any sequence, and the order of applying these diffusion operators can be optimized to find the partial solution rather than the final one, for example, to be subsequently used with another circuit utilizing the same oracle or a different oracle, such as a simpler oracle. The oracle/ diffusion operator sequence can be optimized so a measurement, such as a measurement of an ancillary qubit or other qubit, will allow for conditional execution of subsequent parts of the circuit, for all or nearly all measurement results, so the total probability of success is increased in comparison with just the final measurement. The oracle/diffusion operator sequence can be optimized, for example, to generate shorter circuits with lower success probability than longer ones, resulting in lower expected number of the oracle calls needed to obtain the solution.

As discussed above, the diffusion operators can be constructed so the complexity of oracles is reduced around particular diffusion operators G, by omitting parts of circuits of oracles commuting with G with no change to the result. Scaling of the complexity of the circuit with increased size the database's number of records is no worse than O(Log (N)*sgrt(N)), this can be further optimized on the case by case basis, depending on the particular quantum computing problem being solved.

Figure 8:
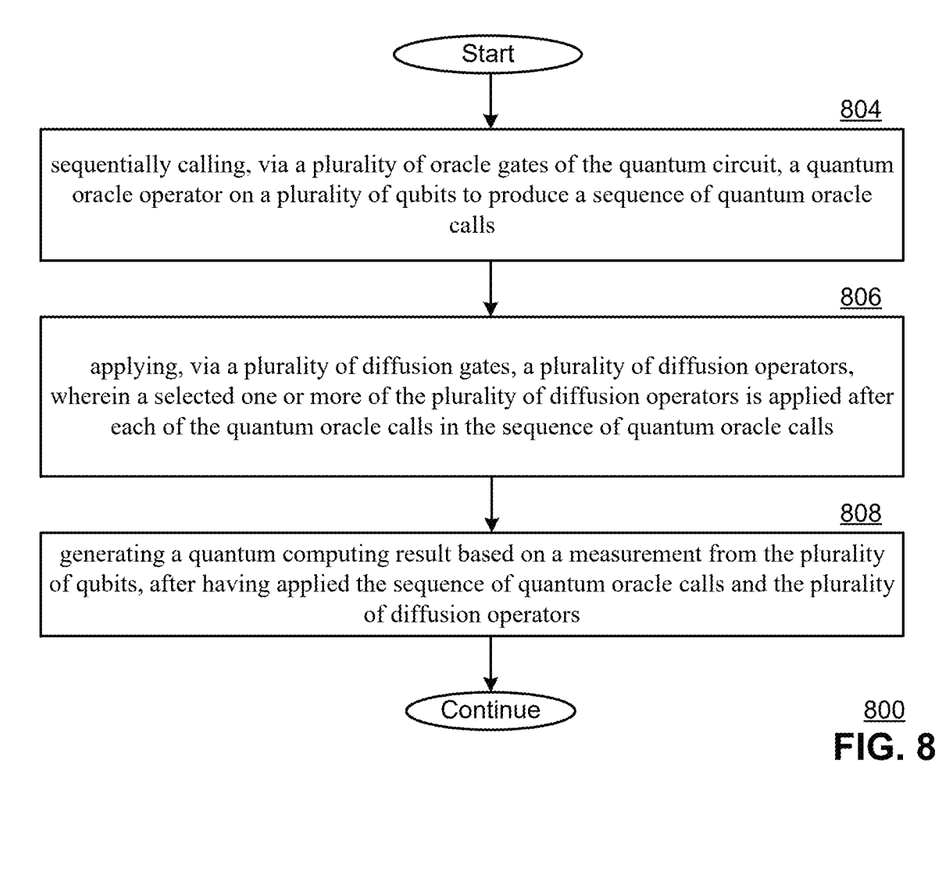
FIG. 8 is a flow diagram of an embodiment of a method in accordance with the present invention.

FIG. 8 is a flow diagram 800 of an embodiment of a method in accordance with the present invention. In particular, a method is presented for use with one or more functions and features described in conjunctions with FIGS. 1-7. Step 804 includes sequentially calling, via a plurality of oracle gates of a quantum circuit, a quantum oracle operator on a plurality of qubits to produce a sequence of quantum oracle calls. Step 806 includes applying, via a plurality of diffusion gates of the quantum circuit, a plurality of diffusion operators, wherein a selected one or more of thr plurality of diffusion operators is applied after each of the quantum oracle calls in the sequence of oracle calls. Step 808 includes generating a quantum computing result based on a measurement from the plurality of qubits, after having applied the sequence of oracle calls and the plurality of diffusion operators.

In various embodiments, each of the plurality of qubits is initialized to a corresponding initial state and the method further comprises applying, via a plurality of Hadamard gates of the quantum circuit, Hadamard transforms to the plurality of qubits or Hadamard transforms to only a subset of the plurality of qubits.

In various embodiments, each of the plurality of diffusion operators operates on a unique non-zero proper subset of the plurality of qubits. The unique non-zero proper subset of the plurality of qubits can includes two or more neighboring qubits of the plurality of qubits. At least one of the plurality of diffusion operators operates on each of the plurality of qubits.

In various embodiments, the quantum oracle codes a result to an ancilla qubit. The ancilla qubit can be used to execute other parts of the quantum circuit conditionally, based on the measurement. The quantum computing result can be a partial solution and the plurality of diffusion operators can be optimized to generate the partial solution. The partial solution can subsequently be used in another quantum circuit that generates a full solution based on one of: the quantum oracle operator or a different quantum oracle operator.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for use with a quantum circuit and a quantum register having a plurality of qubits, the method comprising:
   sequentially calling, via a plurality of oracle gates of the quantum circuit, a quantum oracle operator on the plurality of qubits to produce a sequence of quantum oracle calls;
   applying, via a plurality of diffusion gates of the quantum circuit, a plurality of different diffusion operators, wherein a selected one or more of the plurality of different diffusion operators is applied after each of the quantum oracle calls in the sequence of quantum oracle calls, wherein the plurality of different diffusion operators operates on a corresponding plurality of unique non-zero proper subsets of the plurality of qubits, and wherein each of the corresponding plurality of unique non-zero proper subsets of the plurality of qubits contains qubits of the plurality of qubits that are each different from ones of the plurality of qubits included in each other one of the corresponding plurality of unique non-zero proper subsets; and
   generating a quantum computing result based on a measurement from the plurality of qubits, after having applied the sequence of oracle calls and the plurality of different diffusion operators.

2. The method of claim 1, wherein each of the plurality of qubits is initialized to a corresponding initial state and the method further comprises applying, via a plurality of Hadamard gates of the quantum circuit, Hadamard transforms to a subset of the plurality of qubits.

3. The method of claim 1, further comprising:
applying, via a plurality of Hadamard gates of the quantum circuit, Hadamard transforms to the plurality of qubits.

4. The method of claim 1, wherein the plurality of different diffusion operators, together, operate on states of each of the plurality of qubits.

5. The method of claim 4, wherein the each of the corresponding plurality of unique non-zero proper subsets of the plurality of qubits includes two or more neighboring qubits of the plurality of qubits.

6. The method of claim 1, wherein the quantum oracle codes a result to an ancilla qubit.

7. The method of claim 1, wherein a measurement of an ancilla qubit is used to execute other parts of the quantum circuit conditionally, wherein the other parts of the quantum circuit include at least one additional diffusion gate and at least one additional oracle gate that are executed prior to generating the quantum computing result based on the measurement from the plurality of qubits, in response to the measurement of the ancilla qubit yielding a first measurement result, and wherein the quantum computing result is generated directly based on the measurement from the plurality of qubits, in response to the measurement of the ancilla qubit yielding a second measurement result.

8. The method of claim 1, wherein the quantum computing result is a partial solution and wherein the plurality of different diffusion operators is optimized to generate the partial solution.

9. The method of claim 8, wherein the partial solution is subsequently used in another quantum circuit that generates a full solution based on one of: the quantum oracle operator or a different quantum oracle operator.

10. A quantum circuit operating on a plurality of qubits, the quantum circuit comprising:
a plurality of oracle gates configured to sequentially apply a quantum oracle operator on the plurality of qubits to produce a sequence of quantum oracle calls;
a plurality of diffusion gates configured to apply a plurality of different diffusion operators, wherein a selected one or more of the plurality of different diffusion operators is applied after each of the quantum oracle calls in the sequence of quantum oracle calls, wherein the plurality of different diffusion operators operates on a corresponding plurality of unique non-zero proper subsets of the plurality of qubits, and wherein each of the corresponding plurality of unique non-zero proper subsets of the plurality of qubits contains qubits of the plurality of qubits that are each different from ones of the plurality of qubits included in each other one of the corresponding plurality of unique non-zero proper subsets; and
a measurement function configured to generate a quantum computing result based on a measurement from the plurality of qubits, after the sequence of oracle calls are applied and after the plurality of different diffusion operators are applied.

11. The quantum circuit of claim 10, wherein each of the plurality of qubits is initialized to a corresponding initial state and the quantum circuit further includes:
a plurality of Hadamard gates configured to apply a Hadamard transform to only a non-zero proper subset of the plurality of qubits.

12. The quantum circuit of claim 10, wherein the quantum circuit further includes:
a plurality of Hadamard gates configured to apply a Hadamard transform to the plurality of qubits.

13. The quantum circuit of claim 10, wherein the plurality of different diffusion operators, together, operate on states of each of the plurality of qubits.

14. The quantum circuit of claim 13, wherein the each of the corresponding pluraltiy of unique non-zero proper subsets of the plurality of qubits includes two or more neighboring qubits of the plurality of qubits.

15. The quantum circuit of claim 10, wherein the quantum oracle codes a result to an ancilla qubit.

16. The quantum circuit of claim 10, wherein a measurement of an ancilla qubit is used to execute other parts of the quantum circuit conditionally, wherein the other parts of the quantum circuit include at least one additional diffusion gate and at least one additional oracle gate that are executed prior to generating the quantum computing result based on the measurement from the plurality of qubits, in response to the measurement of the ancilla qubit yielding a first measurement result, and wherein the quantum computing result is generated directly based on the measurement from the plurality of qubits, in response to the measurement of the ancilla qubit yielding a second measurement result.

17. The quantum circuit of claim 10, wherein the quantum computing result is a partial solution and wherein the plurality of different diffusion operators is optimized to generate the partial solution.

18. The quantum circuit of claim 17, wherein the partial solution is subsequently used in another quantum circuit that generates a full solution based on one of: the quantum oracle operator or a different quantum oracle operator.

* * * * *